(12) United States Patent
Schmitz et al.

(10) Patent No.: US 12,088,332 B2
(45) Date of Patent: Sep. 10, 2024

(54) APPARATUSES, METHODS, AND COMPUTER PROGRAMS FOR A MOBILE TRANSCEIVER AND FOR A NETWORK ENTITY, MOBILE TRANSCEIVER, NETWORK ENTITY, MOBILE COMMUNICATION SYSTEM

(71) Applicants: VOLKSWAGEN AKTIENGESELLSCHAFT, Wolfsburg (DE); AUDI AG, Ingolstadt (DE)

(72) Inventors: Steffen Schmitz, Wesel (DE); Jörg Plechinger, Munich (DE)

(73) Assignees: VOLKSWAGEN AKTIENGESELLSCHAFT (DE); AUDI AG (DE)

(*) Notice: Subject to any disclaimer, the term of this patent is extended or adjusted under 35 U.S.C. 154(b) by 27 days.

(21) Appl. No.: 17/268,615

(22) PCT Filed: Aug. 8, 2019

(86) PCT No.: PCT/EP2019/071333
§ 371 (c)(1),
(2) Date: Feb. 16, 2021

(87) PCT Pub. No.: WO2020/035390
PCT Pub. Date: Feb. 20, 2020

(65) Prior Publication Data
US 2021/0242895 A1 Aug. 5, 2021

(30) Foreign Application Priority Data
Aug. 17, 2018 (EP) .................................. 18189546

(51) Int. Cl.
*H04B 1/3827* (2015.01)
*H04B 1/405* (2015.01)
(Continued)

(52) U.S. Cl.
CPC ........... *H04B 1/3827* (2013.01); *H04B 1/405* (2013.01); *H04W 4/70* (2018.02); *H04W 60/00* (2013.01); *H04W 72/51* (2023.01)

(58) Field of Classification Search
CPC ....... H04B 1/3827; H04B 1/405; H04W 4/20; H04W 4/70; H04W 60/00; H04W 72/048
See application file for complete search history.

(56) References Cited

U.S. PATENT DOCUMENTS 5,396,645 A * 3/1995 Huff ...................... H04W 36/04
455/438
5,507,008 A * 4/1996 Kanai ................... H04W 16/04
455/512
(Continued)

FOREIGN PATENT DOCUMENTS

CN 105450609 A 3/2016
CN 107135543 A 9/2017
(Continued)

OTHER PUBLICATIONS

ETSI TS 138 306; 5G; NR; User Equipment (UE) radio access capabilities (3GPP TS 38.306 version 15.2.0 Release 15); Sep. 2018.
(Continued)

*Primary Examiner* — Nguyen T Vo
(74) *Attorney, Agent, or Firm* — Barnes & Thornburg LLP

(57) ABSTRACT

Apparatuses, methods, and computer programs for a mobile transceiver and for a network entity, a mobile transceiver, a network entity and a system, an apparatus, a method, and a computer program for a mobile transceiver. The method for a mobile transceiver to communicate in a mobile commu-
(Continued)

receiving information on a field of application from a mobile transceiver

22 scheduling radio resources for data communication with the mobile transceiver based on the information on the field of application — 24

20 nication system includes providing information on a field of application of the mobile transceiver to the mobile communication system.

26 Claims, 3 Drawing Sheets

(51) Int. Cl.
*H04W 4/70* (2018.01)
*H04W 60/00* (2009.01)
*H04W 72/51* (2023.01)

(56) References Cited

U.S. PATENT DOCUMENTS

| | | | |
|---|---|---|---|
| 8,400,991 B2 | 3/2013 | Trachewsky et al. | |
| 9,271,297 B2 | 2/2016 | Valentin et al. | |
| 10,820,276 B2* | 10/2020 | Dauneria | H04W 4/70 |
| 10,917,778 B2 | 2/2021 | Wang et al. | |
| 2011/0287776 A1* | 11/2011 | Vujcic | H04W 74/0833 |
| | | | 455/452.1 |
| 2014/0098778 A1 | 4/2014 | Valentin et al. | |
| 2015/0085778 A1 | 3/2015 | Morioka | |
| 2017/0164301 A1 | 6/2017 | Jeon et al. | |
| 2017/0223723 A1* | 8/2017 | Das | H04W 72/0453 |
| 2017/0318567 A1 | 11/2017 | Morioka | |
| 2018/0279203 A1* | 9/2018 | da Silva | H04W 48/10 |
| 2018/0295653 A1* | 10/2018 | Ashraf | H04W 72/23 |
| 2018/0317218 A1* | 11/2018 | Li | H04W 72/1268 |
| 2019/0357304 A1 | 11/2019 | Zeng et al. | |
| 2020/0053553 A1* | 2/2020 | Adachi | H04W 72/02 |
| 2020/0374743 A1* | 11/2020 | Xin | H04W 4/00 |
| 2021/0029590 A1* | 1/2021 | Ying | H04W 8/08 |
| 2021/0212034 A1* | 7/2021 | Deng | H04W 72/042 |
| 2021/0274568 A1* | 9/2021 | Sengupta | H04W 56/005 |

FOREIGN PATENT DOCUMENTS

| | | | |
|---|---|---|---|
| CN | 107295454 | A | 10/2017 |
| CN | 107431969 | A | 12/2017 |
| EP | 1133207 | A1 | 9/2001 |
| EP | 2530989 | A1 | 12/2012 |
| EP | 3425976 | A1 | 1/2019 |
| EP | 3439394 | A1 | 2/2019 |
| KR | 20110083456 | A | 7/2011 |
| KR | 20140017662 | A | 2/2014 |
| WO | 2006031495 | A2 | 3/2006 |
| WO | 2017067607 | A1 | 4/2017 |
| WO | 2017132991 | A1 | 8/2017 |
| WO | 2017167287 | A1 | 10/2017 |
| WO | 2018027996 | A1 | 2/2018 |

OTHER PUBLICATIONS

Office Action for European Patent Application No. 18189546.7; Nov. 4, 2020.
Search Report for European Patent Application No. 18189546.7; Feb. 13, 2019.
Search Report and Written Opinion for International Patent Application No. PCT/EP2019/071333; Sep. 9, 2019.
Office Action for Korean Patent Application No. 10-2021-7007144; Dec. 20, 2021.
Examiniation Report for European Patent Application No. 18189546.7; Mar. 24, 2022.
Notice of Final Rejection for Korean Patent Application No. 10-2021-7007144; Jun. 20, 2022.
Office Action; European Patent Application No. 18189546.7; Jun. 21, 2023.
Office Action; Chinese Patent Application No. 201980068485.9; Sep. 28, 2023.
Office Action; Chinese Patent Application No. 201980068485.9; Mar. 2, 2024.

* cited by examiner providing information on a field of application of the mobile transceiver to the mobile communication system

APPARATUSES, METHODS, AND COMPUTER PROGRAMS FOR A MOBILE TRANSCEIVER AND FOR A NETWORK ENTITY, MOBILE TRANSCEIVER, NETWORK ENTITY, MOBILE COMMUNICATION SYSTEM

PRIORITY CLAIM

This patent application is a U.S. National Phase of International Patent Application No. PCT/EP2019/071333, filed 8 Aug. 2019, which claims priority to European Patent Application No. 18189546.7, filed 17 Aug. 2018, the disclosures of which are incorporated herein by reference in their entireties.

SUMMARY

Illustrative embodiments relate to apparatuses, methods, and computer programs for a mobile transceiver and for a network entity, a mobile transceiver, a network entity and a mobile communication system, more particularly, but not exclusively, to a concept for communicating information on a field of application of a mobile transceiver to a network entity, which may base radio resource control on the information.

BRIEF DESCRIPTION OF THE DRAWINGS

Disclosed embodiments will be described by way of example only, and with reference to the accompanying figures, in which:

FIG. 1 illustrates a block diagram of an exemplary embodiment of a method for a mobile transceiver;

DETAILED DESCRIPTION

Figure 2:
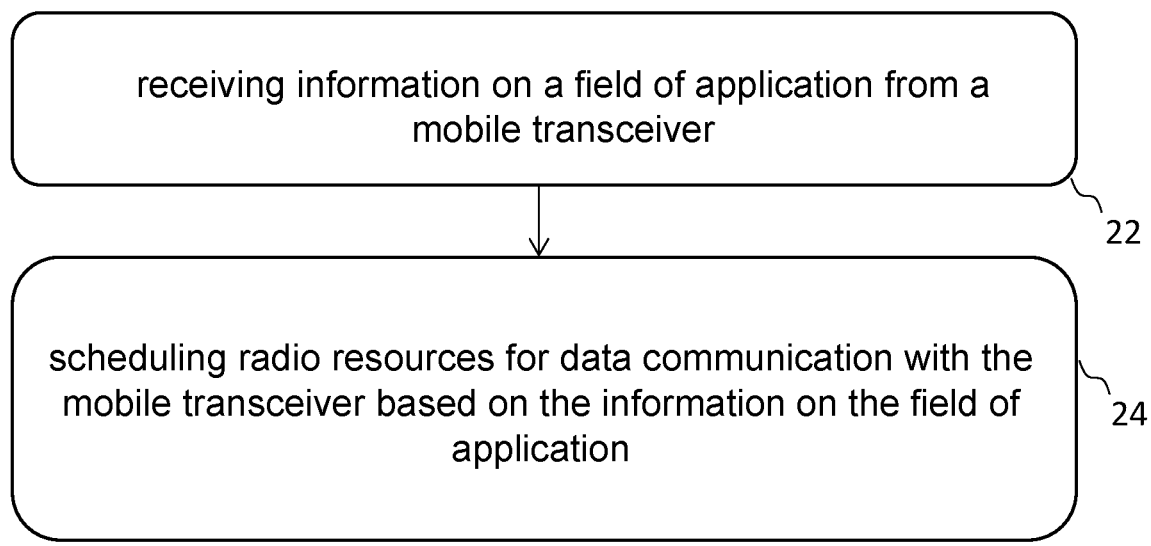
FIG. 2 illustrates a block diagram of an exemplary embodiment of a method for a network entity.

Nowadays, most cellular network devices comply with standards and specifications of the 3rd Generation Partnership Project (3GPP). A vast majority of these user devices or User Equipment (UE) are available in terms of mobile phones or modules/chips, which are used in such small devices, e.g., smartphones and mobile hotspots. With the introduction of new technologies and next generation systems, e.g., 5G, IMT-2020 (5th Generation, International Mobile Telecommunication system 2020), industrial applications are foreseen and targeted.

Document CN105450609 A describes an encapsulation for Common Public Radio Interface (CPRI) frames, which may use signaling of control information in a CPRI header. The control signaling may comprise an antenna number field. Document U.S. Pat. No. 8,400,991 B2 considers support of multiple wireless communication protocols in a Wireless Local Area Network (WLAN). The document suggests using a signaling field including a number of antennas, which may be used for signal processing. Document WO 2006/031495 A2 describes a smart antenna implementation, in which a number antenna beams may be signaled in an according control field. Document WO 2018/027996 A1 describes a concept for control information signaling. In 3GPP TS (Technical Specification) 38.306, e.g., V15.2.0 (1018-06), specifies UE radio access capabilities, which are signaled as Radio Resource Control (RRC), cf. 3GPP TS 38.331 V15.2.1 section 5.6.

While these concepts may allow signaling of a number of antennas there is further information, which may be beneficial for data and signal processing.

There is a demand for an improved concept for signaling information about a mobile transceiver in a mobile communication system. The independent claims provide an improved concept for signaling information about a mobile transceiver.

Disclosed embodiments are based on the finding that form factors and properties of mobile transceivers or UEs may change. For example, utilization and mounting of communication modules in transportation vehicles may enable new services, as well as using 5G technologies in manufacturing and health monitoring applications (e.g., remote health monitoring, remote surgery). It is a finding that information on an application field of a mobile transceiver may be useful for the network to consider the field of application, for example, for adaptation of data/signal processing and radio resource management. Disclosed embodiments are based on the finding that signaling of a field of application for a mobile transceiver may be beneficially exploited on the network side of a mobile communication system. Disclosed embodiments hence enable an efficient concept for signaling of application field information of a UE. It is a further finding that 3GPP currently has no mechanism to identify a UE with special purpose or special condition arousing from the actual hardware implementation. As an example, it cannot be identified whether a permanently mounted UE and therefore also no permanently mounted UE in transportation vehicles exist. 3GPP treats this kind of UE like any other UE. A permanently mounted UE can have different capabilities due to its mounting or any other specialty due to the environment the UE is operated/located in. In transportation vehicles, one specialty could be a two-receive antenna operation compared to a four-receive antenna operation of, e.g., handheld UE.

Disclosed embodiments provide a method for a mobile transceiver, which is configured to communicate in a mobile communication system. The method comprises providing information on a field of application of the mobile transceiver to the mobile communication system. Based on the information on the field of application, the communication system may enable more efficient processing and resource management.

The information on the field of application may comprise information on whether the mobile transceiver is permanently mounted into a transportation vehicle. Based on the knowledge that a certain UE is permanently mounted in a vehicle processing algorithms can be adapted. For example, antennas mounted on the body of a transportation vehicle usually have different characteristics than antennas of a stand-alone smartphone.

In another exemplary embodiment the information on the field of application may comprise information on whether the mobile transceiver is used for data communication in manufacturing or production. In such a case, exemplary embodiments may apply enhanced resource scheduling, e.g., prioritizing or deprioritizing UEs in manufacturing or production. For example, some applications in manufacturing or production may have certain latency requirements, which can be considered by a resource scheduler once it is known that the field of application is manufacturing or production.

The information on the field of application may comprise information on whether the mobile transceiver is used for data communication in a health application. Disclosed embodiments may enable an adaptation on network algorithms to health applications.

For example, the health application may comprise remote health monitoring or remote surgery. In exemplary embodiments Quality of Service (QOS) parameters or requirements may be related to the field of application. For example, certain requirements with respect to latency and error rate may be applied for UEs in health applications.

In further exemplary embodiments the information on the field of application may comprise information on an implementation of the mobile transceiver. Such implementation details may be considered in the network to improve processing or overall system efficiency.

The information on the implementation may comprise information on a number of transmit and/or receive antennas used by the mobile transceiver. Information on the number of antennas may indicate whether the mobile transceiver supports any spatial processing schemes, receive diversity, transmit diversity, spatial multiplexing, beamforming, etc., which can then be considered when setting transmission/reception parameters by the network.

Information on a number of transmit and/or receive antennas used by the mobile transceiver per transmission or reception band may be comprised in the information on the implementation in further exemplary embodiments. Making such information available to the network on a per band basis may further enhance radio resource and system capacity management.

In some exemplary embodiments the providing of the information on the field of application may be carried out during a registering process of the mobile transceiver in the mobile communication system. Such exemplary embodiments may be able to use the field of application information from registration onwards at an early stage of data communication.

Another exemplary embodiment is a method for a network entity of a mobile communication system, the method comprises receiving information on a field of application from a mobile transceiver, and scheduling radio resources for data communication with the mobile transceiver based on the information on the field of application. Disclosed embodiments may allow more efficient radio resource scheduling.

The method may further comprise receiving the information on the field of application during a registration process of the mobile transceiver at the network entity. The network entity may then use the field of application of the mobile transceiver from the registration on.

For example, receiving of the information on the field of application may use radio resource control signaling. Disclosed embodiments may enable signaling of application field information as part of a control plane embedded in a layer 3 signaling protocol.

Disclosed embodiments also provide an apparatus for a mobile transceiver configured to communicate in a mobile communication system. Another exemplary embodiment is a mobile transceiver or a transportation vehicle comprising an exemplary embodiment of the apparatus. The apparatus comprises one or more interfaces configured to communicate in the mobile communication system, and a control module configured to perform one of the methods as described herein.

Another exemplary embodiment is an apparatus for a network entity configured to communicate in a mobile communication system. A network entity comprising the apparatus is yet another exemplary embodiment. The apparatus comprises one or more interfaces configured to communicate in the mobile communication system, and a control module configured to perform one of the methods described herein.

A system comprising a mobile transceiver and a network entity is another exemplary embodiment, the apparatuses respectively. A system method comprising method operations for a mobile transceiver and a network entity is yet another exemplary embodiment.

Yet another exemplary embodiment is a computer program having a program code for performing at least one of the methods described herein, when the computer program is executed on a computer, a processor, or a programmable hardware component. A further exemplary embodiment is a computer readable storage medium or machine readable storage medium storing instructions which, when executed by a computer, processor, or programmable hardware component, cause the computer to implement one of the methods described herein.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, exemplary embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted similarly.

The terminology used herein is for the purpose of describing particular disclosed embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" or "including", when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Disclosed embodiments are based on the finding that information on a field of application of a mobile transceiver, e.g., information on mounting specifics and application related requirements, can be beneficially exploited in a mobile communication system. Disclosed embodiments therefore provide an efficient mechanism for signaling such information.

FIG. 1 illustrates a block diagram of an exemplary embodiment of a method 10 for a mobile transceiver. The mobile transceiver is configured to communicate in a mobile communication system. The method 10 comprises providing 12 information on a field of application of the mobile transceiver to the mobile communication system.

FIG. 2 illustrates a block diagram of an exemplary embodiment of a method 20 for a network entity of a mobile communication system. The method 20 comprises receiving 22 information on a field of application from a mobile transceiver. The method 20 further comprises scheduling 24 radio resources for data communication with the mobile transceiver based on the information on the field of application.

Figure 3:
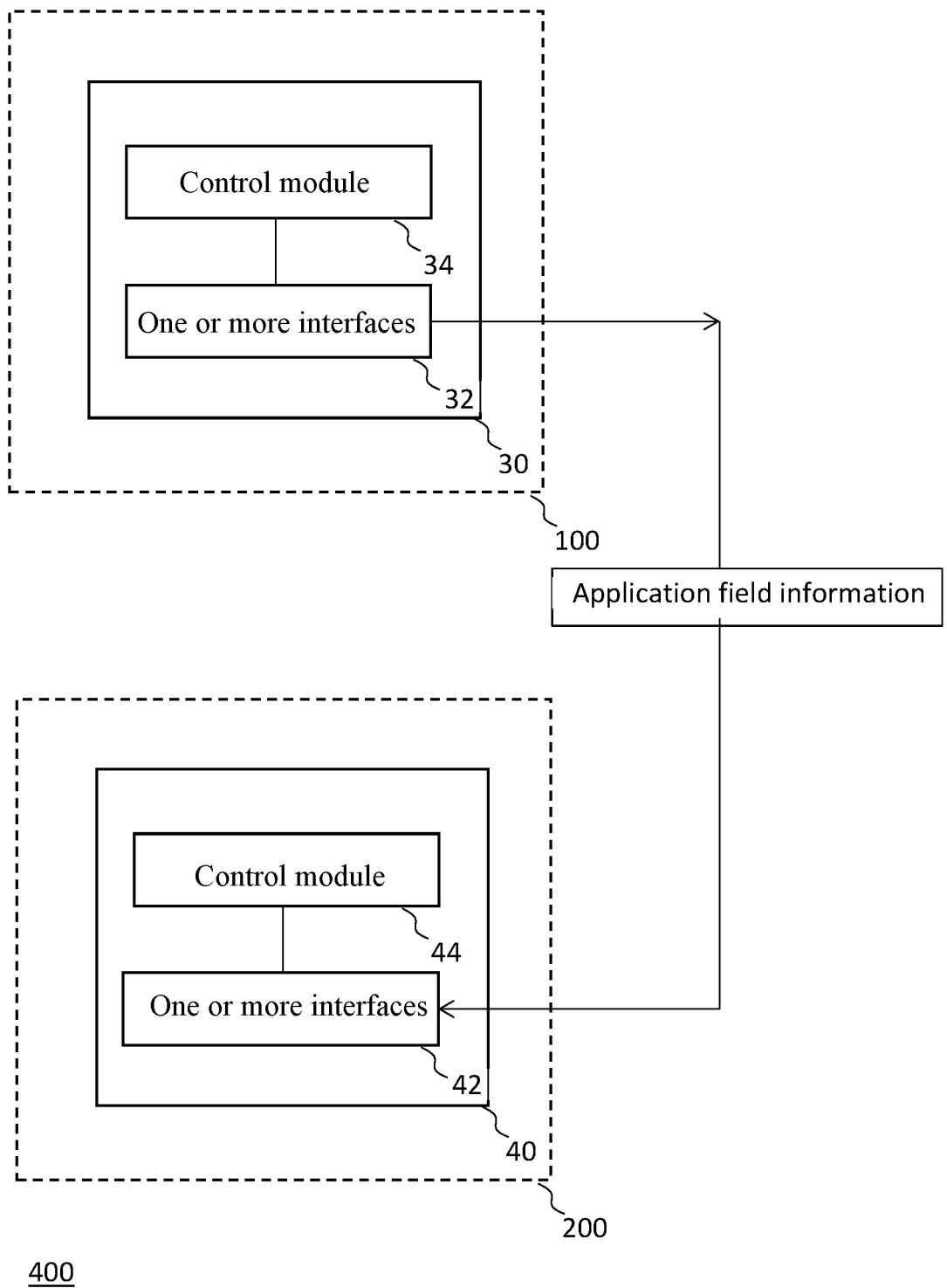
FIG. 3 shows exemplary embodiments of an apparatus for a mobile transceiver, a mobile transceiver, an apparatus for a network entity, a network entity and a mobile communication system.

FIG. 3 shows exemplary embodiments of an apparatus 30 for a mobile transceiver 100, a mobile transceiver 100, an apparatus 40 for a network entity 200, a network entity 200 and a mobile communication system 400. The apparatus 30 for the mobile transceiver 100 is configured to communicate in a mobile communication system 400. The apparatus 30 comprises one or more interfaces 32, which are configured to communicate in the mobile communication system 400. The apparatus further comprises a control module 34, which is coupled to the one or more interfaces 32. The control module 34 is configured to control the one or more interfaces 32 and to perform one of the methods 10 as described herein. FIG. 3 also shows an exemplary embodiment of a mobile transceiver 100 comprising the apparatus 30.

The apparatus 40 for the network entity 200 in FIG. 3 is configured to communicate in the mobile communication system 400. The apparatus 40 comprises one or more interfaces 42, which are configured to communicate in the mobile communication system 400. The apparatus 40 further comprises a control module 34, which is coupled to the one or more interfaces 42. The control module 44 is configured to control the one or more interfaces 42 and to perform one of the methods 20 as described herein. As shown in FIG. 3 the disclosed embodiment of the network entity 200 comprises the apparatus 40.

In disclosed embodiments the one or more interfaces 32, 42 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface 32, 42 may be wireless or wireline and it may be configured to communicate, i.e., transmit or receive signals, information with further internal or external components. The one or more interfaces 32, 42 may comprise further components to enable according communication in the mobile communication system 400, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 32, 42 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, combinations thereof, etc. In some examples the one or more interfaces 32, 42 may serve the purpose of transmitting or receiving or both, transmitting and receiving, information, such as information related to perceptual data, sensor data, measurement data, capabilities, application requirements, trigger indications, requests, message interface configurations, feedback, information related to control commands etc.

As shown in FIG. 3 the respective one or more interfaces 32, 34 are coupled to the respective control modules 34, 44 at the apparatuses 30, 40. In disclosed embodiments the control modules 34, 44 may be implemented using one or more processing units, one or more processing devices, any method or mechanism for processing, such as a processor, a computer or a programmable hardware component being operable with accordingly adapted software. In other words, the described functions of the control modules 34, 44 may as well be implemented in software, which is then executed on one or more programmable hardware components. Such hardware components may comprise a general purpose processor, a Digital Signal Processor (DSP), a micro-controller, etc.

FIG. 3 also shows an exemplary embodiment of a system 400 comprising disclosed embodiments of the mobile transceiver 100, which may be a transportation vehicle, a mobile or a relay transceiver. In exemplary embodiments, communication, i.e., transmission, reception or both, may take place among mobile transceivers/vehicles 100 directly and/or between mobile transceivers/vehicles 100 and the network component/entity 200, e.g., infrastructure, application server, base station, network server, backend server, etc. Such communication may make use of a mobile communication system 400. Such communication may be carried out directly, e.g., by Device-to-Device (D2D) communication, which may also comprise Vehicle-to-Vehicle (V2V) or car-to-car communication in case of transportation vehicles 100. Such communication may be carried out using the specifications of a mobile communication system 400.

The mobile communication system 400 may, for example, correspond to one of the Third Generation Partnership Project (3GPP)-standardized mobile communication networks, where the term mobile communication system is used synonymously to mobile communication network. The mobile or wireless communication system 400 may correspond to a mobile communication system of the 5th Generation (5G) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

A network entity 200 or base station transceiver can be operable or configured to communicate with one or more active mobile transceivers/vehicles 100 and a base station transceiver can be located in or adjacent to a coverage area of another base station transceiver, e.g., a macro cell base station transceiver or small cell base station transceiver. Hence, disclosed embodiments may provide a mobile communication system 400 comprising two or more mobile transceivers/vehicles 100 and one or more base station transceivers, wherein the base station transceivers may establish macro cells or small cells, as e.g., pico-, metro-, or femto cells. A mobile transceiver 100 may correspond to a smartphone, a cell phone, user equipment, a laptop, a notebook, a personal computer, a Personal Digital Assistant (PDA), a Universal Serial Bus (USB)-stick, a car, a transportation vehicle etc. A mobile transceiver may also be referred to as User Equipment (UE) or mobile in line with the 3GPP terminology. A transportation vehicle may correspond to any conceivable method or mechanism for transportation, e.g., a car, a bike, a motorbike, a van, a truck, a bus, a ship, a boat, a plane, a train, a tram, etc.

A base station transceiver can be located in the fixed or stationary part of the network or system. A base station transceiver may correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a Base Transceiver Station (BTS), an access point, a remote radio head, a relay station, a transmission point etc., which may be further subdivided in a remote unit and a central unit.

A mobile transceiver 100 can be associated with a base station transceiver or cell. The term cell refers to a coverage area of radio services provided by a base station transceiver, e.g., a NodeB (NB), an eNodeB (eNB), a remote radio head, a transmission point, etc. A base station transceiver may operate one or more cells on one or more frequency layers, in some exemplary embodiments a cell may correspond to a sector. For example, sectors can be achieved using sector antennas, which provide a characteristic for covering an angular section around a remote unit or base station transceiver. In some disclosed embodiments, a base station transceiver may, for example, operate three or six cells covering sectors of 120° (in case of three cells), 60° (in case of six cells) respectively. A base station transceiver may operate multiple sectorized antennas. In the following a cell may represent an according base station transceiver generating the cell or, likewise, a base station transceiver may represent a cell the base station transceiver generates.

Mobile transceivers 100 may communicate directly with each other, i.e., without involving any base station transceiver, which is also referred to as Device-to-Device (D2D) communication. An example of D2D is direct communication between transportation vehicles, also referred to as Vehicle-to-Vehicle communication (V2V), car-to-car using 802.11p, respectively. In exemplary embodiments the one or more interfaces 32,42 can be configured to use this kind of communication. To do so radio resources are used, e.g., frequency, time, code, and/or spatial resources, which may as well be used for wireless communication with a base station transceiver. The assignment of the radio resources may be controlled by a base station transceiver, i.e., the determination which resources are used for D2D and which are not taking into account the application field information. Here and in the following radio resources of the respective components may correspond to any radio resources conceivable on radio carriers and they may use the same or different granularities on the respective carriers. The radio resources may correspond to a Resource Block (RB as in LTE/LTE-A/LTE-unlicensed (LTE-U)), one or more carriers, sub-carriers, one or more radio frames, radio sub-frames, radio slots, one or more code sequences potentially with a respective spreading factor, one or more spatial resources, such as spatial sub-channels, spatial precoding vectors, any combination thereof, etc.

For example, direct Cellular Vehicle-to-Anything (C-V2X), where V2X includes at least V2V, V2-Infrastructure (V2I), etc., transmission according to 3GPP Release 14 can be managed by infrastructure (so-called mode 3) or run in a User Equipment (UE) Autonomous mode (UEA), (so-called mode 4). In exemplary embodiments a mobile transceiver 100 as indicated by FIG. 3 may be registered in the same mobile communication system 400. In other exemplary embodiments one or more of the mobile transceivers 100 may be registered in different mobile communication systems 400. The different mobile communication systems 400 may use the same access technology but different operators or they may use different access technologies as outlined above.

In disclosed embodiments the methods and implementation may be based on the IMT-2020 (5G) standards/requirements. For example, disclosed embodiments may enhance TS 38.306 with UE specific application field information, which will be detailed in the sequel. In some exemplary embodiments the information on the field of application comprises information on whether the mobile transceiver 100 is permanently mounted into a transportation vehicle. This information can be useful in the network as permanent mounting in a transportation vehicle has certain implications. For example, power supply of a transportation vehicle is a lot more robust and of higher endurance as for a typical smart phone. Antenna characteristics and gains of permanently mounted vehicular antennas are different. E.g., the spacing between antennas on a transportation vehicle may typically be a lot wider than on a smartphone. Vehicular antennas may be larger and may therefore provide different gains than antennas mounted in a cell phone. Therefore spatial signal processing concepts, e.g., diversity concepts, spatial multiplexing, beamforming, may be more efficient if the UE is permanently mounted on a transportation vehicle.

Once the field of application of the mobile transceiver 100 is known, several transmission parameters may be based on the field of application as part of the radio resource scheduling including assignment of transmission parameters by the network entity 200. For example, uplink transmission (from the mobile transceiver 100 to the network entity 200) may be adapted to the field of application. A vehicular mobile transceiver or a mobile transceiver applied in the field of production or manufacturing may be assigned a higher transmission power or a modulation/coding scheme, which may use up more energy than a regular assignment, e.g., OFDMA instead of SCFDMA. This may increase reception quality at the network entity 200, e.g., in terms of a reduced error rate. In such an exemplary embodiment the field of application may indicate to the network entity 200 that the mobile transceiver 100 may have access to a higher capacity energy source than a regular handheld and hence power consumption at the mobile transceiver 100 might not be a main optimization parameter for scheduling radio resources including assignment of transmission parameters by the network entity 200.

Coming back to the disclosed embodiment using the 3GPP specifications, for example, the section "Optional features without UE radio access capability parameters" may be enhanced by a signaling field relating to the UE application field, e.g., "permanenty_vehicle_mountedUE" indicating that the UE is permanently mounted into a transportation vehicle. In may be further specified what are the further assumptions for such a UE. As mentioned above, antennas mounted in or on transportation vehicles may provide different properties than antennas of smartphones. In an exemplary embodiment relating to enhanced antenna properties to the field of application such antenna properties may be specified.

The information on the field of application may comprise information on whether the mobile transceiver 100 is used for data communication in manufacturing or production. This may be particularly useful in private networks and/or networks not utilizing 3GPP authentication mechanisms. For identifying whether the application field is manufacturing or production another signaling field like e.g., "ProductionClassUE" may be introduced. This field may identify UEs, which are used in manufacturing or in a manufacturing/production environment. Operators, their network entities 200, respectively, may then treat these UEs differently when scheduling radio resources. In some disclosed embodiments it is conceivable to prioritize these UEs (e.g., when short latency requirements apply), in other disclosed embodiments it is conceivable to de-prioritize these UEs (when a high delay tolerance applies). Moreover, consideration of further device properties is conceivable. For example, such UEs may only be served in certain or pre-defined geographical regions to preclude utilization outside private networks.

Another example of a field of application in exemplary embodiments is the field of health or medical applications. The information on the field of application may comprise information on whether the mobile transceiver 100 is used for data communication in a health or medical application. For example, such a health or medical application may comprise remote health monitoring or remote surgery. Again, certain QoS requirements may be related to such an application which may be taken into account by the network. The information on the field of application may comprise information on an implementation of the mobile transceiver 100. The information on the implementation may comprise information on special or specific properties of an implementation, e.g., in a transportation vehicle, a certain kind or type of transportation vehicle (e.g., car, van, truck, train, plane, etc.). For example, the information on the implementation may comprise information on a number of transmit and/or receive antennas used by the mobile transceiver 100, which can be per transmission or reception band. Again, another information field like e.g., "maxNumberRxAntenna" may be introduced, e.g., also per frequency band or access technology, to signal such a property.

In disclosed embodiments the above described methods may comprise providing 12 the information on the field of application during a registering process of the mobile transceiver 100 in the mobile communication system 400. In such disclosed embodiments the application field of a UE may then be (automatically) made known to the network at an early stage, and may hence be considered by the network in the further handling of such a UE 100. The method 20 of the network side may hence comprise receiving 22 the information on the field of application during a registration process of the mobile transceiver 100 at the network entity 200. For example, radio resource control signaling may be used to signal the application field information. The methods 10, 20 may then comprise providing 12/receiving 22 the information on the field of application using radio resource control signaling.

As already mentioned, in disclosed embodiments the respective methods may be implemented as computer programs or codes, which can be executed on a respective hardware. Hence, another exemplary embodiment is a computer program having a program code for performing at least one of the above methods, when the computer program is executed on a computer, a processor, or a programmable hardware component. A further disclosed embodiment is a (non-transitory) computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some exemplary embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The disclosed embodiments are also intended to cover computers programmed to perform the methods described herein or (field) programmable logic arrays ((F)PLAs) or (field) programmable gate arrays ((F)PGAs), programmed to perform the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed to furthering the art, and are to be construed as being without limitation to such specifically recited examples and conditions. Moreover, all statements herein reciting principles and embodiments of the disclosure, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate exemplary embodiment. While each claim may stand on its own as a separate exemplary embodiment, it is to be noted that—although a dependent claim may refer in the claims to a specific combination with one or more other claims—other exemplary embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having methods or mechanisms for performing each of the respective operations of these methods.

LIST OF REFERENCE SIGNS 10 method for a mobile transceiver
12 providing information on a field of application of the mobile transceiver to the mobile communication system
20 method for a network entity
22 receiving information on a field of application from a mobile transceiver
24 scheduling radio resources for data communication with the mobile transceiver based on the information on the field of application control module
30 apparatus for a mobile transceiver
32 one or more interfaces
34 control module
40 apparatus for a network entity
42 one or more interfaces
44 control module
100 mobile transceiver
200 network entity/(base station transceiver
400 mobile communication system

The invention claimed is:

1. A method for mobile transceiver communication in a mobile communication system, the method comprising:
transmitting, by a mobile transceiver, mobile transceiver application field information to the mobile communication system, wherein the mobile transceiver application field information relates to Quality of Service requirements and also indicates physical mounting details of the mobile transceiver indicative of antenna characteristics of the mobile transceiver, and
using the mobile transceiver application field information for radio resource management on a network side of the mobile communication system based on capabilities of the mobile transceiver resulting from the physical mounting of the mobile transceiver as indicated in the mobile transceiver application field information, wherein the radio resource management includes scheduling radio resources differently for data communication with the mobile transceiver based on the received mobile transceiver application field information to prioritize physically mounted mobile transceivers communicating in the mobile communication system to comply with the Quality of Service requirements related to and based on the transmitted mobile transceiver application field information.

2. The method of claim 1, wherein the mobile transceiver application field information comprises information indicating whether the mobile transceiver is permanently mounted to a transportation vehicle.

3. The method of claim 1, wherein the mobile transceiver application field information comprises information indicating whether the mobile transceiver is used for data communication in manufacturing thereby being subject to latency requirements to effectively support communication and control of the manufacturing.

4. The method of claim 1, wherein the mobile transceiver application field information comprises information indicating whether the mobile transceiver is used for data communication in a health application thereby being subject to latency requirements to effectively support communication and control of the health application.

5. The method of claim 4, wherein the health application comprises remote health monitoring or remote surgery.

6. The method of claim 1, wherein the radio resource management on a network side of the mobile communication system provides enhanced resource scheduling by the network side of the mobile communication system to support an industrial application of the mobile transceiver.

7. The method of claim 1, wherein the mobile transceiver application field information further indicates physical structural implementation of the mobile transceiver that indicates a number of transmit and/or receive antennas used by the mobile transceiver.

8. The method of claim 1, wherein the mobile transceiver application field information further indicates physical structural implementation of the mobile transceiver that indicates a number of transmit and/or receive antennas used by the mobile transceiver per transmission or reception band.

9. The method of claim 1, further comprising the mobile transceiver transmitting the mobile transceiver application field information during a registering process of the mobile transceiver in the mobile communication system.

10. A non-transitory computer readable medium storing a computer program having a program code for performing the method of claim 1, when the computer program is executed on a computer, a processor, or a programmable hardware component.

11. A method for network entity communication in a mobile communication system, the method comprising:
receiving mobile transceiver application field information transmitted from a mobile transceiver, wherein the mobile transceiver application field information relates to Quality of Service requirements and also indicates physical mounting details of the mobile transceiver indicative of antenna characteristics of the mobile transceiver, and
adapting radio resource management on a network side of the mobile communication system based on capabilities of the mobile transceiver resulting from the physical mounting of the mobile transceiver as indicated in the mobile transceiver application field information, wherein the radio resource management includes scheduling radio resources differently for data communication with the mobile transceiver based on the received mobile transceiver application field information to prioritize physically mounted mobile transceivers communicating in the mobile communication system to comply with the Quality of Service requirements related to and based on the received mobile transceiver application field information.

12. The method of claim 11, wherein the mobile transceiver application field information is received during a registration process of the mobile transceiver at the network entity.

13. The method of claim 11, wherein the mobile transceiver application field information is received using radio resource control signaling.

14. A non-transitory computer readable medium storing a computer program having a program code for performing the method of claim 11, when the computer program is executed on a computer, a processor, or a programmable hardware component.

15. An apparatus for mobile transceiver communication in a mobile communication system, the apparatus comprising:
one or more interfaces configured to communicate in the mobile communication system; and
a control module configured to control communication of the mobile transceiver in the mobile communication system by transmitting mobile transceiver application field information to the mobile communication system,
wherein the mobile transceiver application field information relates to Quality of Service requirements and also indicates physical mounting details of the mobile transceiver indicative of antenna characteristics of the mobile transceiver, and
wherein the mobile transceiver application field information is used for radio resource management on a network side of the mobile communication system based on capabilities of the mobile transceiver resulting from the physical mounting of the mobile transceiver as indicated in the mobile transceiver application field information, wherein the radio resource management includes scheduling radio resources differently for data communication with the mobile transceiver based on the received mobile transceiver application field information to prioritize physically mounted mobile transceivers communicating in the mobile communication system to comply with the Quality of Service requirements related to and based on the received mobile transceiver application field information.

16. The apparatus of claim 15, wherein the mobile transceiver application field information comprises information indicating whether the mobile transceiver is permanently mounted to a transportation vehicle.

17. The apparatus of claim 15, wherein the mobile transceiver application field information comprises information indicating whether the mobile transceiver is used for data communication in manufacturing thereby being subject to latency requirements to effectively support communication and control of the manufacturing.

18. The apparatus of claim 15, wherein the mobile transceiver application field information comprises information indicating whether the mobile transceiver is used for data communication in a health application thereby being subject to latency requirements to effectively support communication and control of the health application.

19. The apparatus of claim 18, wherein the health application comprises remote health monitoring or remote surgery.

20. The apparatus of claim 15, wherein the radio resource management on a network side of the mobile communication system provides enhanced resource scheduling by the network side of the mobile communication system to support an industrial application of the mobile transceiver.

21. The method of claim 15, wherein the mobile transceiver application field information further indicates physical structural implementation of the mobile transceiver that indicates a number of transmit and/or receive antennas used by the mobile transceiver.

22. The method of claim 15, wherein the mobile transceiver application field information further indicates physical structural implementation of the mobile transceiver that indicates a number of transmit and/or receive antennas used by the mobile transceiver per transmission or reception band.

23. The apparatus of claim 15, wherein the mobile transceiver transmits the mobile transceiver application field information during a registering process of the mobile transceiver in the mobile communication system.

24. An apparatus for network entity communication in a mobile communication system, the apparatus comprising:
one or more interfaces to communicate in the mobile communication system; and
a control module to control communication of a mobile transceiver in the mobile communication system by:
receiving mobile transceiver application field information transmitted from the mobile transceiver,
wherein the mobile transceiver application field information relates to Quality of Service requirements and also indicates physical mounting details of the mobile transceiver indicative of antenna characteristics of the mobile transceiver,
wherein the mobile transceiver application field information enables adaptation of radio resource management on a network side of the mobile communication system based on capabilities of the mobile transceiver resulting from the physical mounting of the mobile transceiver as indicated in the mobile transceiver application field information, and
wherein the radio resource management includes scheduling radio resources differently for data communication with the mobile transceiver based on the received mobile transceiver application field information to physically mounted prioritize mobile transceivers communicating in the mobile communication system to comply with the Quality of Service requirements related to and based on the received mobile transceiver application field information.

25. The apparatus of claim 24, wherein the mobile transceiver application field information is received during a registration process of the mobile transceiver at the network entity.

26. The apparatus of claim 24, wherein the mobile transceiver application field information is received using radio resource control signaling.

* * * * *